United States Patent
Sutanto et al.

[19]

[11] Patent Number: 5,999,820
[45] Date of Patent: Dec. 7, 1999

[54] DISPATCH CONSOLE HAVING COMMUNICATION MODULES WITH CALLER TRACKING FEATURE

[75] Inventors: Surja Sutanto; Robin Wallace Grier; Thomas E. Powell; David William Helfrich, all of Lynchburg, Va.

[73] Assignee: Ericsson Inc., Research Triangle Park, N.C.

[21] Appl. No.: 08/835,849

[22] Filed: Apr. 30, 1997

[51] Int. Cl.⁶ .................................................. H04B 7/00
[52] U.S. Cl. ........................................... 455/508; 455/521
[58] Field of Search ..................................... 455/507, 508, 455/517, 518, 519, 520, 521, 566; 379/267

[56] References Cited

U.S. PATENT DOCUMENTS

| | | | |
|---|---|---|---|
| 4,251,865 | 2/1981 | Moore et al. | 364/200 |
| 4,698,805 | 10/1987 | Sasuta et al. | 370/97 |
| 4,723,264 | 2/1988 | Sasuta et al. | 455/518 |
| 4,901,314 | 2/1990 | Lohrbach | 371/11.2 |
| 4,926,495 | 5/1990 | Comroe et al. | 455/54 |
| 4,961,070 | 10/1990 | Maher et al. | 340/721 |
| 5,159,701 | 10/1992 | Barnes et al. | 455/15 |
| 5,175,866 | 12/1992 | Childress et al. | 455/8 |
| 5,200,954 | 4/1993 | Teel, Jr. et al. | 370/94.1 |
| 5,241,537 | 8/1993 | Gulliford et al. | 370/67 |
| 5,371,900 | 12/1994 | Bar-On et al. | 455/508 |
| 5,384,854 | 1/1995 | Downs et al. | 381/81 |
| 5,423,061 | 6/1995 | Fumarolo et al. | 455/519 |
| 5,479,477 | 12/1995 | McVey et al. | 455/508 |
| 5,530,914 | 6/1996 | McPheters | 455/508 |
| 5,566,388 | 10/1996 | Brame et al. | 370/95.1 |
| 5,613,201 | 3/1997 | Alford et al. | 455/331 |
| 5,634,196 | 5/1997 | Alford | 455/186.1 |
| 5,650,995 | 7/1997 | Kent | 455/508 |
| 5,754,960 | 5/1998 | Downs et al. | 455/508 |
| 5,758,291 | 5/1998 | Grube et al. | 455/518 |

*Primary Examiner*—Reinhard J. Eisenzopf
*Assistant Examiner*—Duc Nguyen
*Attorney, Agent, or Firm*—Davidson & Gribbell, LLP

[57] ABSTRACT

A dispatch console for a radio system is disclosed, where the radio system includes an audio switching tower which routes audio communications between a switching device and audio input/output devices at the dispatch console. The dispatch console includes a personal computer for communicating command messages to the audio switching tower, the personal computer storing information on numerous audio communications initiated and terminated in the radio system. The dispatch console further includes a device connected to the personal computer permitting an operator of said display console to interface therewith and a display screen segmented into a plurality of windows. At least one of the windows represents a communication module presenting information with respect to a particular talk group of the radio system, with each communication module including a callee area for displaying an alias for the talk group programmed on the communication module, a caller area for displaying an alias for a radio unit in the talk group when a call from the radio unit has been activated, a call area for displaying a call type for a call activated by a radio unit in the talk group, and a list box displaying a predetermined number of radio units in the talk group which have activated calls.

39 Claims, 4 Drawing Sheets

DISPATCH CONSOLE HAVING COMMUNICATION MODULES WITH CALLER TRACKING FEATURE

BACKGROUND OF THE INVENTION

1. Field of the Invention

The present invention relates generally to communication modules for radio systems and, more particularly, to a communication module for a dispatch console displaying certain caller information with respect to a particular talk group of a radio system.

2. Description of Related Art

It is well known that radio systems, whether public or private, typically include at least one dispatch console so that the user thereof can interface or communicate with the radio units in the field. In this way, the dispatcher is able to communicate with a radio unit, a talk group, or even multiple talk groups simultaneously. Some dispatch consoles include a personal computer which communicates control messages to a central electronics controller for the radio system, as well as receives and stores certain information from the central electronics controller. Additionally, the dispatch console includes a keyboard, a mouse, and a display screen connected to the personal computer in order to permit interaction with the dispatch console and depict certain information relating thereto, respectively.

In particular, the display screen is generally organized or segmented into windows so that certain desired information relating to the radio system may be grouped together for ease of use. For example, one such area on the screen includes the depiction of one or more communication modules which are utilized to represent a specific talk group (defined as one or more radio units). It will be understood that each communication module is able to display various call activities relating to the talk group, usually in real time.

In at least one type of dispatch console, utilized with a radio system manufactured by Ericsson Inc. and known as C3 Maestro™, the dispatcher has the ability to view a "call history" window where the alias or ID of a radio unit is displayed when keyed on a talk group. This call history stores a predetermined number of callers from all programmed talk groups, with a limited number thereof being visible in the window at any given time. Each communication module also maintains a list of a certain number of callers which most recently keyed on a particular talk group. After the radio unit is un-keyed, its alias or ID is erased from the communication module.

Oftentimes, a dispatcher would like to quickly see which radio units are currently active on a particular talk group. This information allows the dispatcher to know what a particular radio unit is working on, and therefore assists him in efficiently assigning a different radio unit to work on other tasks. By "active," it is meant that the radio unit has activated some calls on the talk group, but it does not have to be keyed on at the particular instant in time when the dispatcher is looking. It has been found, however, that the current process for obtaining the status information for a given communication module is unwieldy and could lead to inaccurate results.

In the aforementioned C3 Maestro dispatch console, the dispatcher first has to pick the talk group communication module of interest and click on a button to open up the call history dialog box therefor. He then must scroll through a list of the last 24 callers and visually filter out duplicate entries therein. Further, in order to ensure that the radio unit has not logged into or keyed on another talk group, the dispatcher must open up the call history for each talk group and check to see if the radio unit exists therein. In small systems with only a few talk groups and low call traffic, this process is only marginally acceptable. For a large system with high call traffic, such a process would be too time consuming (especially in an emergency situation).

Ericsson Inc. also provides a system, known as the EDACS® Status & Message System, which provides the ability to send short, predefined data transmissions from operator units (mobiles or portables) to a fixed-end display computer. This system supports two different types of data transmissions, specified as "status" and "message." The status transmission indicates the operational status of the unit while the message transmission involves real time information being sent to the dispatcher. It will be appreciated that the EDACS system includes a module call history, but like the prior dispatch console design described above, it does not display the call status/activity and the caller history together for each talk group represented by a communication module. Additionally, the call history therein does not filter the entries so that they are unique with respect to the particular talk group let alone all talk groups represented. Thus, the dispatcher for such a system is still unable to determine easily which units are active at a particular point in time.

Accordingly, it is a primary object of the present invention to provide a dispatch console for a radio system in which each communication module is displayed in a manner that enables a dispatcher to quickly and accurately determine which radio units are currently active in a particular talk group.

It is another object of the present invention to provide a dispatch console for a radio system in which each communication module automatically displays a listing of radio units for a particular talk group which have activated calls.

It is still another object of the present invention to provide a dispatch console for a radio system in which each communication module maintains a radio unit within a listing of recent callers after it is unkeyed and removed from the call display.

Yet another object of the present invention is to provide a dispatch console for a radio system in which each communication module removes a radio unit from the listing of recent callers in a particular talk group if the radio unit activates a call to a talk group of another communication module.

Still another object of the present invention is to provide a dispatch console for a radio system in which each communication module prevents designated radio units from being displayed or permits only designated radio units to be displayed in a listing of recent callers.

A further object of the present invention is to provide a dispatch console for a radio system in which each communication module reflects the status of a particular talk group.

These objects and other features of the present invention will become more readily apparent upon reference to the following description when taken in conjunction with the following drawing.

SUMMARY OF THE INVENTION

In accordance with a first aspect of the present invention, a dispatch console for a radio system is disclosed in which the radio system includes an audio switching tower which routes audio communications between a switching device and audio input/output devices at the dispatch console. The dispatch console includes a personal computer for communicating command messages to the audio switching tower, the personal computer storing information on numerous audio communications in the radio system. The dispatch console further includes a device connected to the personal computer permitting an operator of the display console to interface therewith and a display screen segmented into windows. At least one of the windows represents a communication module presenting information with respect to a particular talk group of the radio system, with each communication module including a callee area for displaying an alias for the talk group programmed on the communication module, a caller area for displaying an alias for a radio unit in the talk group when a call from the radio unit has been activated, a call area for displaying a call type for a call activated by a radio unit in the talk group, and a list box for displaying the aliases of a predetermined number of radio units activating calls.

In accordance with a second aspect of the present invention, a communication module depicted as a window on a display screen of a dispatch console for a radio system is disclosed, wherein the communication module presents information with respect to a particular talk group of the radio system. The communication module includes a callee area for displaying an alias for the talk group programmed on the communication module, a caller area for displaying an alias for a radio unit in the talk group when a call from the radio unit has been activated, a call area for displaying a call type for a call activated by a radio unit in the talk group, and a list box for displaying the aliases of a predetermined number of radio units in the talk group activating calls.

In accordance with a third aspect of the present invention, a communication module depicted as a window on a display screen of a dispatch console for a radio system is disclosed, the communication module presenting information with respect to a particular talk group of the radio system. A particular status of the communication module is indicated by a predefined background color of the window for the communication module.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
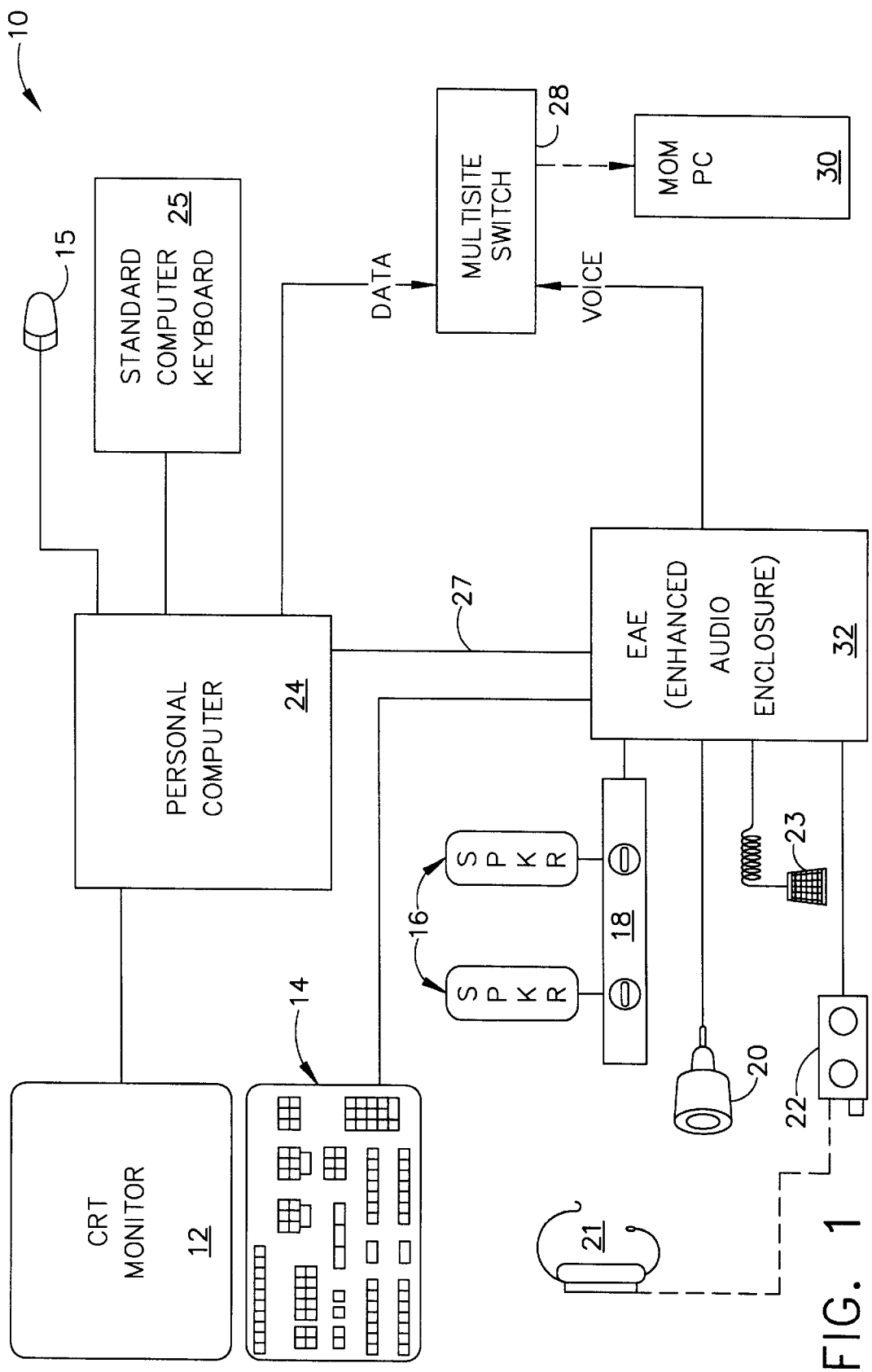
FIG. 1 is a block diagram of a dispatch console for a communications system in accordance with the present invention.

Referring now to the drawing in detail, wherein identical numerals indicate the same elements throughout the figures, FIG. 1 depicts a dispatch console for an RF communications system in accordance with the present invention identified by the numeral 10. It will be understood that dispatch console 10 generally conforms to that shown and described in a patent application entitled "Display Console and User Interface For Multisite RF Trunked System," Ser. No. 07/835,689, which is also owned by the assignee of the present invention and hereby incorporated by reference.

It will be seen in FIG. 1 that dispatch console 10 includes a CRT monitor 12, a customized keyboard 14 with labeled keys, a mouse 15, audio speakers 16 (preferably from two to twelve in number), speaker volume controls 18 located beneath each speaker 16, a microphone 20 (or alternatively a headset 21 with volume control 22), and a foot switch 23 which acts as a push-to-talk switch. The user of the dispatch console, or dispatcher, operates dispatch console 10 by viewing CRT monitor 12, with keyboard 14 and mouse 15 providing complete control over dispatch console 10. Of course, CRT monitor 12 may be of the type which has a touch screen for dispatcher interaction in place of or alternatively to mouse 15. For the dispatcher's convenience, however, push-to-talk switches are provided on microphone 20 and foot pedal 23.

Speakers 16, microphone 20, headset 21 and foot pedal 23 are connected to an audio communications tower 32. CRT monitor 12 and an optional standard keyboard 25 are connected to a conventional personal computer 24. In the preferred embodiment, personal computer 24 is an AT-class PC computer (or higher) equipped with VGA graphics (or higher), at least 16 megabytes of RAM, a hard disk and a floppy disk for loading software. Personal computer 24 preferably uses the Windows NT operating system published by Microsoft Corporation of Redmond, Wash., but this is not deemed to be limiting on the type of operating system which may be utilized with the present invention.

It will be noted in the previous version of the dispatch console shown in the aforementioned patent application that personal computer 24 included an internal co-processor logic board that is shown and described in U.S. Pat. No. 5,384,854 to Stephen R. Downs et al., which is owned by the assignee of the present invention an hereby incorporated by reference. The co-processor board performed the audio and command routing functions necessary for dispatch console 10, and essentially allowed a standard personal computer to be converted into a dispatch console. In that version, keyboard 14 was coupled to personal computer 24 via the co-processor logic board. A standard keyboard 25 may also be connected to personal computer 24, but it is not necessary for the operation of dispatch console 10.

Dispatch console 10 communicates with the RF communication system through a switching device in a console electronics controller or a multisite switch. For purposes of this application, a multisite switch 28 will be utilized as the switching device in the description of dispatch console 10.

Multisite switch 28 routes audio (voice) and data signals throughout the RF communications system. It will be understood that through multisite switch 28 dispatch console 10 communicates with trunked and conventional radio systems coupled to multisite switch 28, telephone lines connected to multisite switch 28, and to other dispatch consoles. Dispatch console 10 and the switching device preferably communicate using the messages and the protocols described in U.S. Pat. No. 5,200,954, entitled "Protocol Between Console and RF Trunking Switch," which is also owned by the assignee of the present invention and hereby incorporated by reference.

A central control computer 30 for the RF communications system or MOM-PC is under the control of the system operator for the entire system and utilized to provide individual dispatcher profiles and entity databases onto personal computer 24 via a data link between dispatch console 10 and multisite switch 28. The operation of MOM-PC 30 is described in more detail in U.S. Pat. No. 5,566,388, entitled "RF Trunking Multisite Switch Configuration and Diagnostics Interface," which also is owned by the assignee of the present invention and hereby incorporated by reference.

Besides storing dispatcher profiles, personal computer 24 for dispatch console 10 also stores a database of user entities. Each entity is an individual trunked radio unit (e.g., mobile, portable, or console), a radio talk group, or a conventional radio. Since the entity database may be large (i.e., several thousand radio entities may be present in a multisite system) and it changes in real time, the RAM storage in personal computer 24 preferably is used instead of the ROM storage. It will be understood that the entity database has a record of each entity, including the entity ID number, type of entity (unit and group), home site, home group and an eight character ASCII name.

In the previous version, the dispatch console further included an audio input/output communications module (AIOCM) otherwise known as a communications tower that linked the audio channels from the CIM of multisite switch 28 with speakers 16, microphone 20 and foot pedal 23 thereof. This audio communications tower was an audio routing switch for dispatch console 10 and was controlled via a link 27 with the co-processor logic board in personal computer 24. The audio communications tower and co-processor logic board are described in more detail in U.S. Pat. No. 5,384,854, entitled "Co-Processor Controlled Switching Apparatus and Method For Dispatching Console," which is also owned by the assignee of the present invention and hereby incorporated by reference.

It will be appreciated that the preferred version of dispatch console 10 now includes the logic of the co-processor board in an enhanced audio enclosure (EAE) 32, which has replaced the audio input/output communications module (AIOCM) of the prior design. EAE 32, however, is still utilized to link the audio channels from multisite switch 28 with speakers 16, microphone 20 and foot pedal 23. Accordingly, keyboard 14 is connected directly to EAE 32 and a link 27 is maintained between EAE 32 and personal computer 24.

Figure 2:
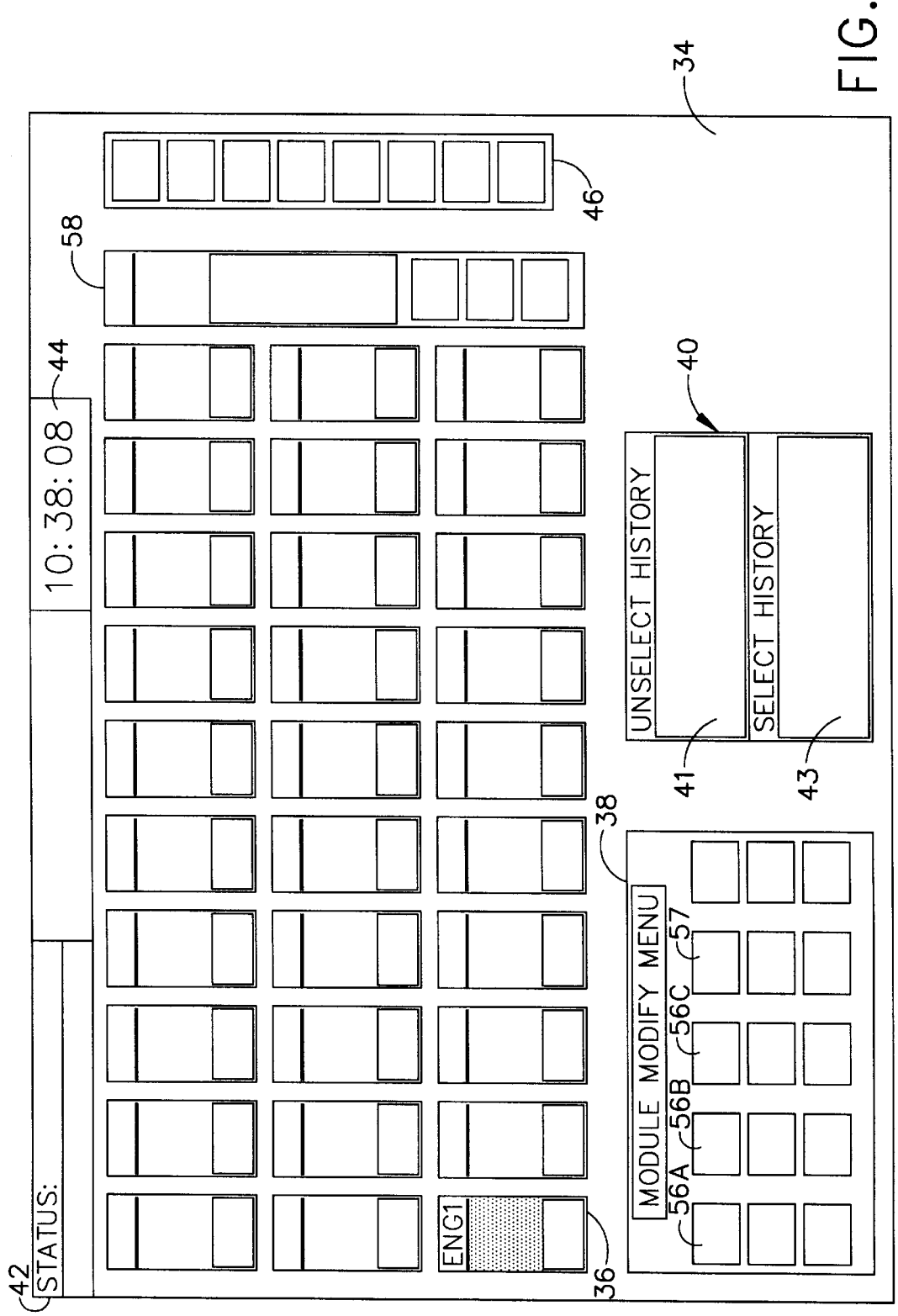
FIG. 2 is an exemplary display screen for the dispatch console depicted in FIG. 1.

As shown in FIG. 2, a display screen 34 of CRT monitor 12 is divided into window segments which provide discrete work areas thereon. It will be noted that display screen 34 differs from that shown in the patent application having Ser. No. 07/835,689 referenced hereinabove since the current system is based on the Windows NT operating system instead of a DOS text type system. Accordingly, display screen 34 includes a plurality of windows which each represent a communication module 36, a dispatch menu window 38, a call history window 40 divided into an unselect history portion 41 and a select history portion 43, a message panel 42, a clock 44, and a function window 46.

The present invention relates particularly to communication modules 36, where each communication module represents a talk group or radio unit which is part of the RF communications system. As described above, it has been difficult for a dispatcher to determine quickly which radio units of a particular talk group are active at a given point in time. Accordingly, communication modules 36 have been modified to include a caller tracking feature which visually records a specified number of recent radio activations (PTT's or push-to-talk's) in a separate list box.

Figure 3:
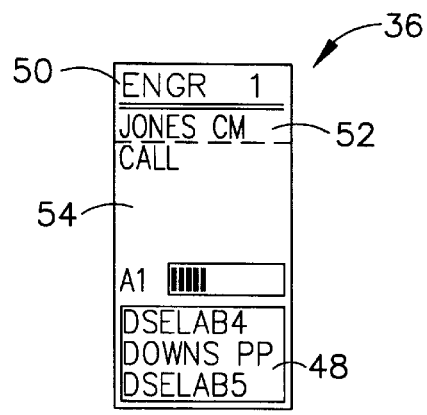
FIG. 3 is an enlarged view of a communication module depicted on the display screen in FIG. 2, where a caller tracking feature in accordance with a first embodiment is incorporated therein.

As seen in FIG. 3, a communication module 36 incorporating a first embodiment of the inventive caller tracking feature includes four specific areas: a list box 48, a callee area 50, a caller area 52, and a call area 54. It will be seen that the alias of the talk group programmed on communication module 36 is positioned within callee area 50 (e.g., ENGR 1). The caller's unit name or alias is located within caller area 52 and the call type (e.g., CALL, EMER, or DVCL) is positioned within call area 54 when there is an active call.

The three most recent unique callers on the talk group are shown within list box 48 and preferably are displayed simultaneously therein by means of a recording which will include the radio alias or LID. The recording will generally be in the order received with the top entry representing the most recent caller. By way of example, it will be noted that the radio unit identified by the alias "DSELAB4" is the most recent caller (or the radio unit activating the most recent call). Since the caller tracking feature of communication modules 36 only records unique callers, list box 48 includes no duplicate entries therein. Thus, if radio unit "DSELAB4" is activates (PTTs) another call, it will merely stay positioned as the most recent caller at the top of list box 48. If the second most recent caller (e.g., radio unit represented by the alias "DOWNS PP") activates a call or is keyed on, it will be moved to the top of list box 48 and become the most recent caller with "DSELAB4" becoming the second most recent caller. The third entry in list box 48 (the radio unit having the alias "DSELAB5") will remain in that position. Of course, if a fourth radio unit activates a call on this communication module, "DSELAB5" drops from list box 48 as the third entry, "DSELAB4" and "DOWNS PP" drop to the second and third entries, respectively, and the alias of the fourth radio unit is located as the first entry.

It will further be noted that the caller tracking feature for each communication module 36 not only records unique callers within that specific communication module, but for all communication modules programmed on dispatch console 10. Thus, should one of the radio units recorded within list box 48 of a first communication module 36 activate a call or be keyed on a second communication module, it will be removed from list box 48 of communication module 36 and recorded only in a list box of the second communication module. In this way, once a given radio unit is found to be active in a particular communication module, the operator of dispatch console 10 need not search any other communication modules. This reduces the amount of searching required to determine which radio units are active and in which talk group they are located.

The caller tracking feature of communication module 36 is also capable of including only certain specific radio unit aliases or excluding certain specific radio unit aliases from being recorded within list box 48 therefor. This capability is configurable and determined at application startup by the dispatcher defining an "exclude" or "include" list of radio unit aliases. It will be understood that dispatcher console 10 tracks all radio units except those in an exclude list or tracks only those radio units contained within an include list. Only one list per console is currently allowed and is used by all communication modules having the caller tracking feature. Thus, the invention provides the flexibility for all consoles to be the same or unique.

In order to delete or remove entities (radio unit aliases) from list box 48, one or more buttons 56 are preferably provided within dispatch menu window 38. More specifically, it is preferred that individual buttons 56A, 56B, and 56C be provided so as to delete the first, second, and third tracked radio units within each list box 48. Of course, the dispatcher may delete an entry even though the picked communication module 36 is not currently on display screen 34. Besides deletion by the dispatcher, it will be appreciated that an entry in list box 46 for a communication module 36 is automatically deleted when additional unique radio units activate a call and list box 46 is full or if the radio unit entry subsequently activates a call on another communication module.

Figure 4:
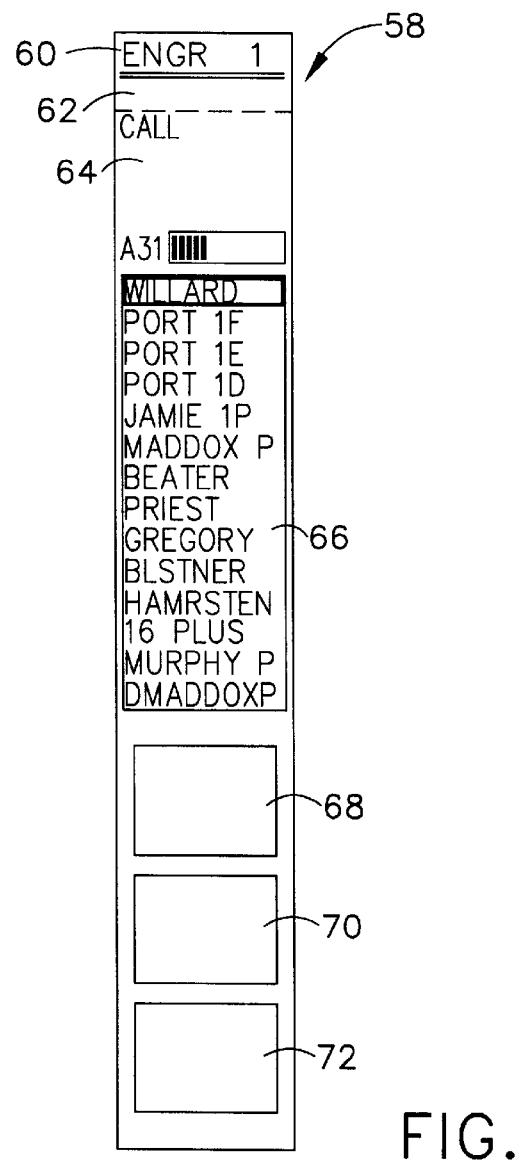
FIG. 4 is an enlarged view of a communication module depicted on the display screen in FIG. 2, where a caller tracking feature in accordance with a second embodiment is incorporated therein.

A communication module 58 containing a second embodiment of the caller tracking feature is depicted in FIG. 4 and likewise includes a callee area 60, a caller area 62, a call area 64 and a list box 66. It will be noted that the size of list box 66 in communication module 58 is comparatively larger than list box 48 in communication module 36. This is to preferably accommodate at least the ten (10) most recent callers for communication module 58. The caller tracking feature of communication module 58 also tracks a designated number of additional recent callers therein than what is displayed in list box 66 (currently up to 64 unique radio units).

In order to view the radio unit aliases other than the most recent ten callers, a scroll up button 68 and a scroll down button 70 are provided within communication module 58. Further, a delete button 72 is provided within communication module 58, thereby eliminating the need for one or more such functional buttons in dispatch window 38 as for communication module 36.

It will be seen that the alias of the radio unit activating the most recent call is preferably positioned at the top of list box 66, as with communication module 36 described hereinabove. The remaining radio unit aliases recorded within list box 66 then follow in chronological order. The most recent caller in list box 66 preferably is highlighted initially so as to more easily identify it (see the alias "Willard" in FIG. 4). As the dispatcher scrolls through the entries in list box 66, however, the highlighted entry is moved up and down accordingly. If a new alias is added to list box 66 by the radio unit thereof activating a call, this newest caller entry is highlighted. If the highlighted entry is removed from list box 66, either by delete button 72 or due to a new caller entry, then the highlighting also returns to the alias of the radio unit activating the most recent call. It will be understood, however, that one entry (radio unit alias) in list box 66 will preferably be highlighted at any given time unless list box 66 is empty.

As noted above with respect to communication module 36, specific radio units within communication module 58 may be excluded or included for caller tracking purposes by defining the appropriate list (which is read during application startup of dispatch console 10). Further, a tracked entry within list box 66 may be removed in the following ways: activating a call on a different talk group programmed on dispatch console 10; selecting the entry and then activating delete button 72; or a $65^{th}$ radio of the same talk group activating a call and thereby removing the oldest entry.

For exemplary purposes, a CRT monitor having a display with 1024 ×768 pixel resolution can accommodate up to 30 communication modules 36 including the small caller tracking feature (three rows of ten each) per page without overlapping. Up to 10 communication modules 58 having the large caller tracking feature can be displayed under like resolution conditions without overlapping. With respect to either embodiment, though, the software of dispatch console 10 first reads the number of standard communication modules (i.e., communication modules of the prior design not having the caller tracking feature described herein), the number of communication modules 36 employing the small caller tracking feature, and the number of communication modules 58 employing the large caller tracking feature to create a configuration file. Based on this information, the appropriate number of window objects representative of such communication modules is created on display screen 34.

The software which performs the functions of the present invention preferably runs on the Microsoft Windows NT operating system and is written in C++ programming language utilizing Microsoft Foundation Class (MFC) class library and the Visual C++ development environment. It will be appreciated that the standard communication module was created using the Developer Studio graphical user interface builder, which is a component of Visual C++. The caller tracking feature of the present invention was incorporated into the standard communication module by adding a list box to the standard module dialog box, with list box 66 of communication module 58 being larger than list box 48 of communication module 36 and having the ability to accommodate buttons 68, 70, and 72.

Figure 5:
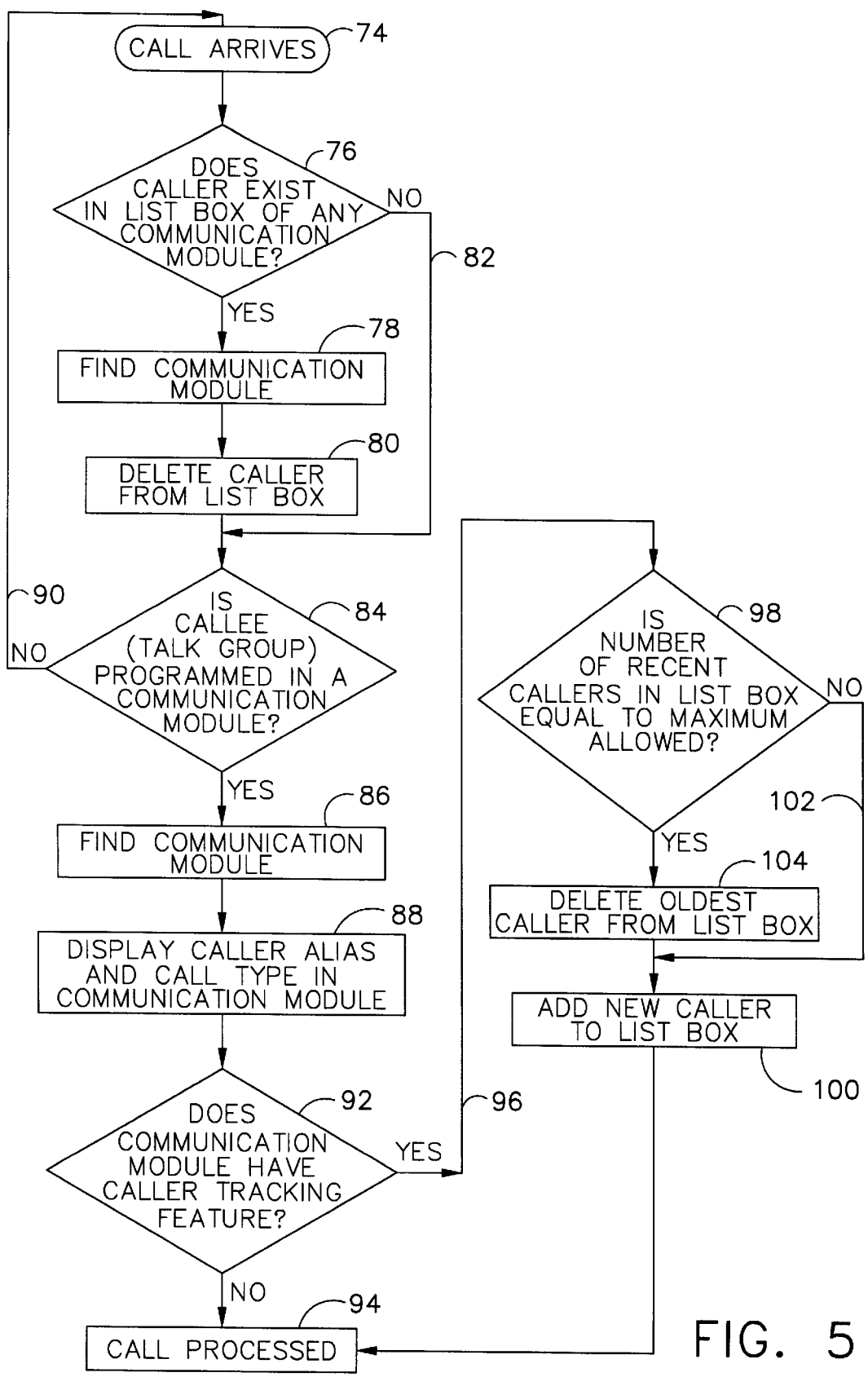
FIG. 5 is a flow diagram depicting the functional steps of the caller tracking feature performed by the communication modules of FIGS. 3 and 4.

It will be understood that the caller tracking feature of communication modules 36 and 58 undergo the same basic operating steps as shown in the flow chart of FIG. 5, with the primary distinction being the number of unique radio unit aliases being displayed in list boxes 48 and 66, respectively, and the ability of communication module 58 to scroll through additional stored radio unit aliases. When a call arrives at dispatch console 10 (see item 74), a search is performed of its programmed talk groups to determine if the caller already exists in the list box of a communication module (i.e., decision block 76). If the answer to this inquiry is yes, the communication module containing such caller is found (block 78) and the caller is removed from the list box thereof (block 80). If the answer to the inquiry in decision block 76 is no, then the operations of blocks 78 and 80 are skipped as signified by line 82.

Next, the logic of the communication module determines whether the callee (talk group) is programmed in a communication module (see decision block 84). If the answer to this inquiry is yes, the communication module therefor is found (block 86) and the caller alias and call type are displayed in such communication module (block 88). If the answer to the inquiry in decision block 84 is answered no, the logic returns to the beginning as seen by feedback line 90.

Provided the callee is programmed in a communication module, the logic continues by determining whether that communication module includes the caller tracking feature described herein (see decision block 92). If the answer to this inquiry is no, the call is processed (block 94) and the software waits for the arrival of another call. If the answer to the inquiry is yes, the caller follows line 96 to decision block 98 where a determination is made as to whether the number of recent callers in the list box for the communication module is at the maximum number allowed thereby (i.e., three entries for the small caller tracking feature and sixty-four entries for the large caller tracking feature). If the answer to this query is no, the caller is merely added to the list box (block 100) via line 102. If the answer is yes, however, the oldest caller in the list box (either the third or sixty-fourth entry) is first deleted (block 104) before adding the new caller thereto. In either event, the call is processed (block 94) once the new caller is added to the list box of the pertinent communication module.

Another aspect to communication modules 36 and 58 of the present invention is the ability to provide status messages relating to the radio units in a particular talk group. Typically, a radio unit activates a particular status by pressing one or more keys on the radio. It will be appreciated that since this status message is sent through the air over the control channel instead of a working channel, this type of message is very fast and makes an efficient use of the RF frequency. Communication modules 36 and 58 generally will understand two primary status messages (e.g., active and inactive). For example, when an active status is received by dispatch console 10, the corresponding module's background color preferably is changed to a predefined color (see communication module 36 in FIG. 2). Otherwise, the module's background color remains normal or returns to normal when an inactive status message is received.

Since the two status messages may be valid over a designated range, each dispatch console 10 can define different numeric values for the status messages and the status messages can mean something different. In this way, the dispatcher can easily find out the status of a talk group by simply looking at the background color of the communication module. This is a drastic improvement over prior methods, as the radio unit in such systems informed the dispatcher about its status using voice communication (and thereby used a considerable amount of precious bandwidth) and the dispatcher used another system to record the status of various units or talk groups.

It will also be appreciated that the dispatcher will preferably have the ability to change the status of any communication modules independently of a radio unit sending a status message, as the dispatcher may become aware of a situation when the radio unit operator is unable to send the required signal to dispatch console 10. In this regard, a button 57 may be provided on module modify menu window 38 (see FIG. 2). The dispatcher may further be given the option of overriding a status message from a radio unit in the particular talk group.

Having shown and described the preferred embodiment of the present invention, further adaptations of the dispatch console and the communication modules displayed therein can be accomplished by appropriate modifications by one of ordinary skill in the art without departing from the scope of the invention. In particular, it is contemplated that a time stamp may accompany each of the entries in list boxes 48 and 66 in order to provide additional information relating thereto. Of course, this or any other characteristic may alter the overall size of communication modules 36 and 58 and thereby limit the number thereof which can be shown on a given display screen.

What is claimed is:

1. A dispatch console for a radio system, said radio system including an audio switching tower which routes audio communications between a switching device and audio input/output devices at said dispatch console, comprising:
   (a) a personal computer for communicating command messages to said audio switching tower, said personal computer storing information on numerous audio communications in said system;
   (b) a device connected to said personal computer permitting an operator of said display console to interface therewith; and
   (c) a display screen segmented into a plurality of windows, wherein at least one of said windows represents a communication module presenting information with respect to a particular talk group of said radio system, each said communication module further comprising:
      (1) a callee area for displaying an alias for said talk group programmed on said communication module;
      (2) a caller area for displaying an alias for a radio unit in said talk group when a call from said radio unit has been activated;
      (3) a call area for displaying a call type for a call activated by a radio unit in said talk group; and
      (4) a list box for displaying the aliases of a predetermined number of radio units in said talk group which have activated calls.

2. The dispatch console of claim 1, wherein said device is a keyboard.

3. The dispatch console of claim 1, wherein said device is a mouse.

4. The dispatch console of claim 1, wherein said device is a touch screen on a monitor providing display of said communication modules.

5. The dispatch console of claim 1, wherein said radio unit aliases displayed in said list box are unique for said communication module.

6. The dispatch console of claim 1, wherein said radio unit aliases displayed in said list box are unique for all said communication modules.

7. The dispatch console of claim 1, wherein said radio unit aliases displayed in said list box are presented in chronological order.

8. The dispatch console of claim 7, wherein an alias for the radio unit activating the most recent call is highlighted in said list box for each said communication module.

9. The dispatch console of claim 7, wherein an alias for the radio unit activating the most recent call is displayed as the top entry in said list box for each said communication module.

10. The dispatch console of claim 1, wherein said radio unit alias is displayed in said caller area and said list box of said communication module when a call is activated.

11. The dispatch console of claim 10, wherein said radio unit alias is deleted from said caller area of said communication module when said call is deactivated.

12. The dispatch console of claim 11, wherein said radio unit alias remains in said list box of said communication module when said call is deactivated.

13. The dispatch console of claim 1, wherein a radio unit alias displayed in said list box of a first communication module is automatically deleted therefrom when said radio unit thereof activates a call on a second communication module.

14. The dispatch console of claim 13, wherein an alias for said radio unit is automatically added to said list box of said second communication module when said call thereon is deactivated.

15. The dispatch console of claim 1, wherein said personal computer stores information relating to calls activated by radio units within said communication module in addition to said radio unit aliases displayed in said list box.

16. The dispatch console of claim 15, wherein said list box for said communication module is scrollable to view radio unit aliases other than those currently displayed.

17. The dispatch console of claim 1, wherein radio unit aliases displayed in said list box for said communication module may be deleted.

18. The dispatch console of claim 1, wherein aliases of certain radio units in a communication module are prevented from being displayed in said list box therefor.

19. The dispatch console of claim 1, wherein aliases of only certain radio units in a communication module are permitted to be displayed in said list box therefor.

20. The dispatch console of claim 1, wherein a status for each said communication module is displayed.

21. The dispatch console of claim 20, wherein a predefined background color for each said communication module is displayed to indicate the status thereof.

22. The dispatch console of claim 20, wherein the status for each said communication module is alterable by a radio unit in the communication module via a status message sent to said switching device over a control channel.

23. A communication module depicted as a window on a display screen of a dispatch console for a radio system, wherein said communication module presents information with respect to a particular talk group of said radio system, comprising:

(a) a callee area for displaying an alias for said talk group programmed on said communication module;

(b) a caller area for displaying an alias for a radio unit in said talk group when a call from said radio unit has been activated;

(c) a call area for displaying a call type for a call activated by a radio unit in said talk group; and (d) a list box for displaying the aliases of a predetermined number of radio units in said talk group which have activated calls.

24. The communication module of claim 23, wherein said radio unit aliases displayed in said list box are unique for said communication module.

25. The communication module of claim 23, wherein said radio unit aliases displayed in said list box are unique for all communication modules programmed on said dispatch console.

26. The communication module of claim 23, wherein said radio unit aliases displayed in said list box are presented in chronological order.

27. The communication module of claim 23, wherein at least one radio unit alias is highlighted at all times.

28. The communication module of claim 23, wherein an alias of a radio unit in said talk group is displayed in said caller area and said list box when a call is activated.

29. The communication module of claim 28, wherein said radio unit alias is deleted from said caller area when said call is deactivated.

30. The communication module of claim 28, wherein said radio unit alias remains in said list box when said call is deactivated.

31. The communication module of claim 23, wherein radio unit aliases displayed in said list box may be deleted.

32. The communication module of claim 31, wherein a radio unit alias displayed in said list box is automatically deleted when said radio unit thereof is activated on a talk group of another communication module.

33. The communication module of claim 31, wherein a radio unit alias displayed in said list box is automatically deleted when the predetermined number of radio unit aliases permitted in said list box has been attained, said radio unit alias activated the oldest call therein, and another radio unit in said talk group unique to said list box activates a call.

34. The communication module of claim 31, wherein a radio unit alias displayed in said list box is deleted when said radio unit alias is highlighted and a delete button for said communication module is activated.

35. The communication module of claim 23, wherein radio unit aliases in addition to those currently displayed in said list box are stored.

36. The communication module of claim 35, wherein said list box has a scrolling feature for viewing radio unit aliases other than those currently displayed.

37. The communication module of claim 23, wherein aliases of certain radio units in said talk group are prevented from being displayed in said list box.

38. The communication module of claim 23, wherein aliases of only certain radio units in said talk group are permitted to be displayed in said list box.

39. The communication module of claim 23, wherein a particular status of said communication module is indicated by a predefined background color of said window.

* * * * *